Dec. 30, 1930.   H. WIEGELMANN   1,786,925

DEVICE FOR PRODUCING SHADOW LINES ON WORK PIECES

Filed Sept. 11, 1928

Inventor:

Hubert Wiegelmann
By Emil Bönnelyche
Attorney

Patented Dec. 30, 1930

1,786,925

UNITED STATES PATENT OFFICE

HUBERT WIEGELMANN, OF NEHEIM, GERMANY

DEVICE FOR PRODUCING SHADOW LINES ON WORK PIECES

Application filed September 11, 1928. Serial No. 305,281.

My invention relates to a device for producing shadow lines, particularly straight lines, on a work piece, for instance, the trunk of a tree which is required to be sawn into boards or beams in the direction of the straight line marked by the shadow. The object of the device is to indicate the path of the saw relative to the work prior to the cut being effected, and to adjust it, before it is cut, on its carriage by which it is fed against the saw so that the least possible waste is caused, this being of considerable importance, for instance, in preparing beams from trunks, or in edging boards.

My invention relates particularly to a device for moving the body producing the shadow, for instance, a stretched wire, perpendicularly to its longitudinal direction and perpendicularly to the direction of the saw cut. To this end the stretched wires of the templet are positively guided as compared with the hitherto used machines in which the ends of each wire had to be changed, the natural result being that errors were frequent. By means of the present new arrangement, the shadow lines are caused to move positively with the saw, thus effecting a great saving in time and preventing mistakes being made.

A further object of my invention is to provide means for moving the wire or the templet or the light source, together with the saw which divides the work piece into boards or beams.

Further particulars of my invention may be gathered from the accompanying drawings which show an embodiment of my invention by way of example.

The carrying frame, which consists of two parallel bars $b$, is fastened to the ceiling or a beam $a$ of the workshop where the device is installed. The two bars are connected by a transverse bar $c$ to which the light source $d$, which may consist of an electric incandescent lamp, preferably a tubular lamp, is secured by means of a suitable socket, the incandescent filament $e$ of the lamp being arranged in the direction in which a linear shadow is to be produced. At both ends of the carrying arms $b$, screws $f_1$ are rotatably journaled. Nuts $g$ are guided on the two screws, the nuts being prevented from rotating by the provision of transverse bars $h$ arranged parallel to each of the two screws, and engaging with the nuts $g$. In this manner the nuts move in longitudinal direction of the screws when the latter are rotated. The ends of the screws carry chain wheels $i_1$ $i_2$ which engage with an endless chain $k$, and as the screw threads on the two screws have equal pitch, and the screws are rotated at the same speed by the common chain, it follows that the two nuts move on the screws at the same speed. A wire $l$ is stretched between the two nuts $g$, and as the two nuts holding the wire move at the same speed, the wire is displaced perpendicularly to its own direction and likewise the shadow which is produced by the wire and the light source on the work piece $m$ disposed underneath the wire.

Figure 1:
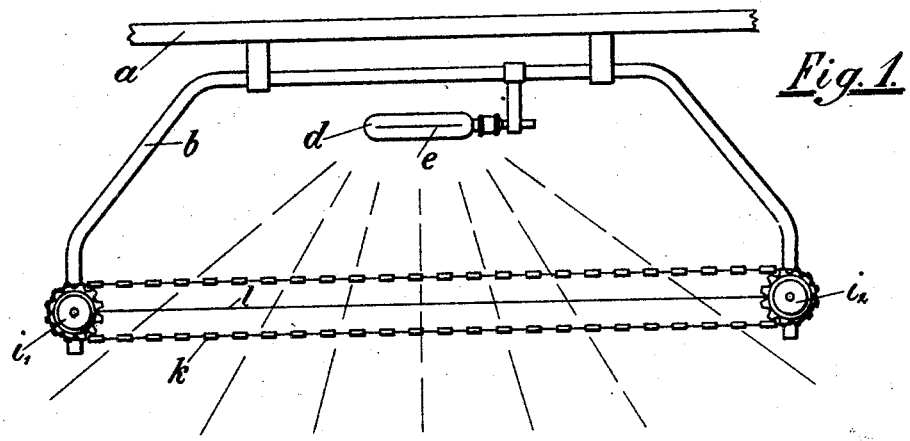
Fig. 1 is a side elevation of the carrying frame for the movable templet.
Figure 2:
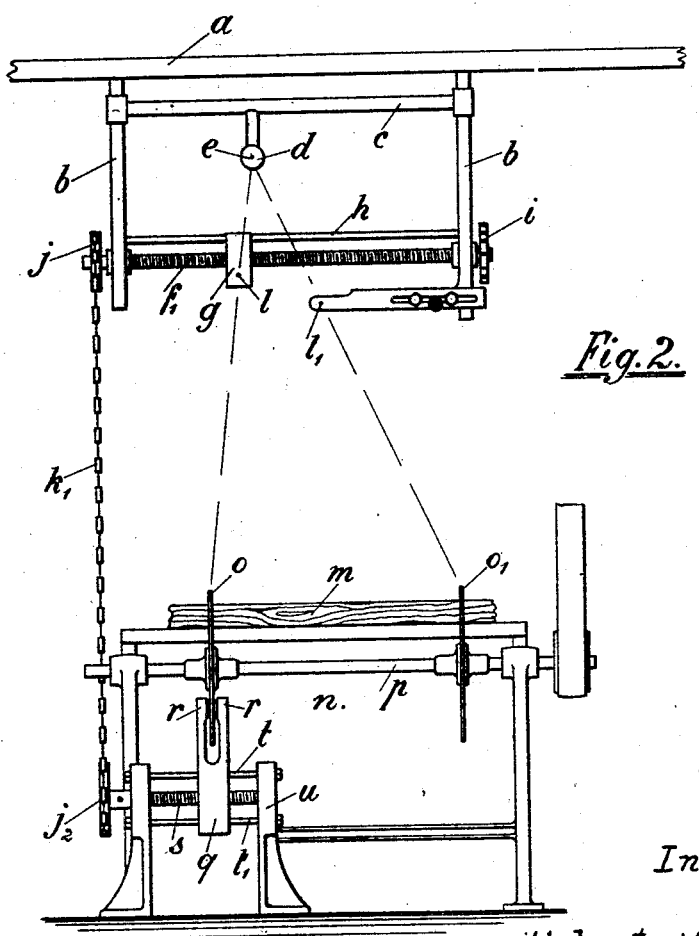
Fig. 2 is an end elevation of the carrying frame in connection with a double edging saw.

As already mentioned in the introduction of the description, the device may be used, for instance, to so adjust a trunk of a tree, which is required to be cut into beams or boards, in a sawing machine in the direction of cut that the smallest amount of waste takes place. In Fig. 2 the device is represented in connection with a sawing machine $n$ in which several circular saws $o$ $o_1$ cut the timber simultaneously, for instance, in order to edge boards of equal width simultaneously at both sides. In this case one of the two saws $o$ is made movable relative to the other one $o_1$ to permit the distance between the saws to be adjusted according to the width of the boards. In the example represented, the saw $o_1$ is assumed to be stationary, while the saw $o$ may be movable and arranged to be displaced in the direction of the common shaft $p$ by means of which the two saws are simultaneously rotated. A member $q$ serves for displacing the movable saw $o$, said member engaging with the saw by means of two arms $r$ and being capable of displacement by a screw $s$, which engages with a tapped bore of the member $q$, by rotating the screw $s$ to the right or left. In order to prevent the member from rotating with the screw, guide bars $t$ $t_1$ are provided which are secured in the same supporting bracket $u$ in which the screw is journaled, and which engage with the member $q$ in such a manner that it is prevented from rotating.

To enable the shadow line, which indicates the path of the saw relative to the work piece, to be moved together with the saw, a transmission member, for instance, an endless chain $k_1$ is interposed between the screw $s$ for moving the saw and the screw $f$ for displacing the templet, said transmission member engaging with the chain wheels $j$ and $j_2$ on the screws $f_1$ and $s$, and transmitting the movement of the screw $s$ to the screws $f_1$.

In case the light source $d$ is stationary, and only the wire $l$ producing the shadow on the work piece is moved to and fro, the speed of the moving shadow line is higher than the speed of the moving wire. In order, therefore, to secure conformity between the lateral movement of the wire and that of the saw, it is necessary to introduce a suitable ratio between the drive of the screws $f_1$ moving the wire and the screw $s$ moving the saw, for instance, by selecting the ratio between the number of teeth of the upper gear and that of the lower gear so as to correspond with the ratio of the distance of the wires or shadows from the light source. In this manner provision is made for the shadow to move at the same speed as the saw.

In the construction according to Fig. 2, two wires $l$ and $l_1$ are provided for producing shadow lines, one of them being stationary and the other movable, whereby the shadow produced by the stationary templet $l_1$ indicates the path of the stationary saw $o_1$ relative to that of the timber to be cut, and the movable wire $l$ indicates the guiding line, which travels with the saw $o$ in a lateral direction, for the cut of the movable saw.

What I claim and desire to secure by Letters Patent of the United States, is:—

1. A device for producing shadow lines on work pieces of sawing machines comprising a carrying frame; a stationary light mounted on said frame; an adjustable wire mounted on said frame and adapted to be moved laterally; a stationary wire mounted on said frame, said adjustable wire cooperating with a movable saw of the sawing machine and the stationary wire with a stationary saw; means for mounting the adjustable wire and the movable saw so that said saw and wire can be adjusted toward or away from the stationary wire and saw to laterally move the shadow line caused by the adjustable wire and light; and means for moving the wire and saw laterally at a speed which is proportional to their distance from the source of light.

2. A device for producing shadow lines on work pieces of sawing machines, comprising a frame; a stationary light mounted on said frame; a stationary wire mounted on the frame and adapted to cooperate with a stationary saw of the sawing machine; a laterally movable wire mounted on the frame and adapted to cooperate with a laterally movable saw of the sawing machine; spindles for driving the movable wire and saw; and means between the spindles for moving the wire and saw laterally at a speed proportional to their distances from the source of light.

In testimony whereof I affix my signature.
HUBERT WIEGELMANN.